United States Patent
Matsumoto et al.

(10) Patent No.: US 8,533,790 B2
(45) Date of Patent: Sep. 10, 2013

(54) SHARING MANAGEMENT PROGRAM, SHARING MANAGEMENT METHOD, TERMINAL APPARATUS AND SHARING MANAGEMENT SYSTEM

(75) Inventors: Kouji Matsumoto, Kawasaki (JP); Etsuo Tsuchiya, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 880 days.

(21) Appl. No.: 11/970,703

(22) Filed: Jan. 8, 2008

(65) Prior Publication Data
US 2008/0109886 A1 May 8, 2008

Related U.S. Application Data

(63) Continuation of application No. PCT/JP2005/012832, filed on Jul. 12, 2005.

(51) Int. Cl.
*G06F 21/00* (2006.01)

(52) U.S. Cl.
USPC ........ 726/5; 726/7; 726/15; 726/17; 713/182; 713/186; 713/188; 709/230; 705/27.1

(58) Field of Classification Search
USPC .......................................................... 726/5, 6
See application file for complete search history.

(56) References Cited

U.S. PATENT DOCUMENTS

| | | | | |
|---|---|---|---|---|
| 5,539,886 A | * | 7/1996 | Aldred et al. | 719/318 |
| 6,208,991 B1 | * | 3/2001 | French et al. | 1/1 |
| 6,301,666 B1 | * | 10/2001 | Rive | 726/27 |
| 6,658,465 B1 | * | 12/2003 | Touboul | 709/223 |
| 7,082,600 B1 | * | 7/2006 | Rau et al. | 717/148 |
| 7,607,131 B2 | | 10/2009 | Oe et al. | |
| 7,917,933 B2 | * | 3/2011 | Thomas et al. | 725/88 |
| 7,941,703 B2 | * | 5/2011 | Grodnik et al. | 714/36 |
| 7,970,805 B2 | | 6/2011 | Deng | |
| 2002/0124119 A1 | * | 9/2002 | Bidarahalli et al. | 709/328 |

(Continued)

FOREIGN PATENT DOCUMENTS

| | | |
|---|---|---|
| JP | 9-259274 | 10/1997 |
| JP | 2000-285076 | 10/2000 |

(Continued)

OTHER PUBLICATIONS

"Setup of Mew-1.93 (edited by imap)", [online], Dec. 22, 1999; [retrieval date: Dec. 2, 2005]; Internet URL: <HTTP://WWW.JOUBAN.PRUG.OR.JP/U/KIT/LINUX/MEW_IMAP.HTML>.

(Continued)

*Primary Examiner* — Morshed Mehedi
(74) *Attorney, Agent, or Firm* — Fujitsu Patent Center (57) ABSTRACT

A sharing management method for sharing a terminal with plural users includes: after completion of login to an operating system of the terminal or after booting up the operating system, starting to record log data for predetermined events; and after the completion of the login to the operating system or after booting up said operating system, prohibiting an operation other than predetermined operations including user authentication in a sharing management program, wherein the user authentication is other than authentication in the operating system. Then, the log data after the user authentication succeeded includes a user identifier in the sharing management program, which relates to a user whose user authentication succeeded. As a result, while ensuring the security in the terminal apparatus shared by plural users, it is possible to rapidly carry out user switching.

3 Claims, 6 Drawing Sheets

(56) References Cited

U.S. PATENT DOCUMENTS

| | | | |
|---|---|---|---|
| 2002/0174369 A1* | 11/2002 | Miyazaki et al. | 713/202 |
| 2002/0178081 A1* | 11/2002 | Omoto et al. | 705/26 |
| 2003/0069919 A1* | 4/2003 | Takahashi et al. | 709/108 |
| 2004/0040024 A1* | 2/2004 | Green et al. | 718/100 |
| 2004/0153675 A1* | 8/2004 | Dorn et al. | 713/202 |
| 2005/0108297 A1* | 5/2005 | Rollin et al. | 707/201 |
| 2005/0114783 A1* | 5/2005 | Szeto | 715/747 |
| 2005/0268336 A1* | 12/2005 | Finnegan | 726/15 |
| 2006/0161783 A1* | 7/2006 | Aiken et al. | 713/182 |
| 2006/0242427 A1* | 10/2006 | Ruzyski et al. | 713/186 |

FOREIGN PATENT DOCUMENTS

| | | |
|---|---|---|
| JP | 2002-328908 | 11/2002 |
| JP | 2003-044297 A | 2/2003 |
| JP | 2003-167641 | 6/2003 |
| WO | WO 99/46747 | 9/1999 |
| WO | WO-2005/050452 A1 | 6/2005 |

OTHER PUBLICATIONS

Anonymous: "The CTDP Linux Startup Manual Version 0.5.0", The Computer Technology Documentation Project.
Jun. 5, 2000, XP002593872, www.comptechdoc.org, retrieved on Jul. 27, 2010.
Japanese Office Action issued Oct. 19, 2010 in corresponding Japanese Patent Application 2007-524490.
European Search Report dated Sep. 15, 2010 issued in corresponding European Patent Application 05765694.4.
Japanese Office Action mailed Jul. 26, 2011 for corresponding Japanese Application No. 2011-049296 (in Japanese).
Fujitsu Limited, "TeamWARE Flow V3.1 Operational Manual", Jan. 2000, p. 2-3, 126-127, 207-208.

* cited by examiner

| SETTING ITEM | VALUE |
|---|---|
| AUTHENTICATION RETRY COUNT | 3 |
| NO OPERATION MONITORING TIME-OUT PERIOD | 1 |
| DIALOG DISPLAY POSITION X | 100 |
| DIALOG DISPLAY POSITION Y | 700 |
| LOGIN ACTIVATION PROGRAM | IEXPLOR.EXE |
| LOGOUT COMPULSIVE TERMINATION PROGRAM | IEXPLOR.EXE |
| LOGOUT COMPULSIVE TERMINATION PROGRAM | NOTE.EXE |
| COMPULSIVE LOGOUT PROGRAM | IEXPLOR.EXE |
| ⋮ | ⋮ |

| TERMINAL NAME | TIME | USER ID | DOMAIN NAME | TYPE | CLASSIFICATION | CONTENTS |
|---|---|---|---|---|---|---|
| ... | ... | ... | ... | ... | ... | ... |
| PCH380 | 17:38:19 | daiko | PCH380 | GET WINDOW TITLE | REGULAR | [Program Manager]WINDOW WAS DETECTED. APPLICATION NAME:[Explorer] |
| PCH380 | 17:38:23 | daiko | PCH380 | GET WINDOW TITLE | REGULAR | [FINGERPRINT PASSWORD AUTHENTICATION]WINDOW WAS DETECTED. APPLICATION NAME:[SLBDTKJoin] |
| PCH380 | 17:38:23 | daiko | PCH380 | ACTIVATE APPLICATION | REGULAR | [SLBDTKJoin]WAS ACTIVATED. |
| PCH380 | 17:38:36 | daiko | PCH380 | TERMINATE APPLICATION | REGULAR | [SLBDTKJoin]WAS TERMINATED. ← 701 |
| PCH380 | 17:38:37 | user01 | PCH380 | GET WINDOW TITLE | REGULAR | [AUTHENTICATION]WINDOW WAS DETECTED. APPLICATION NAME:[SLBDTKJoin] |
| PCH380 | 17:38:37 | user01 | PCH380 | ACTIVATE APPLICATION | REGULAR | [SLBDTKJoin]WAS ACTIVATED. |
| PCH380 | 17:38:42 | user01 | PCH380 | GET WINDOW TITLE | REGULAR | [START MENU]WINDOW WAS DETECTED. APPLICATION NAME:[Explorer] |
| PCH380 | 17:38:42 | user01 | PCH380 | ACTIVATE APPLICATION | REGULAR | [Explorer]WAS ACTIVATED. ← 705 |
| PCH380 | 17:38:48 | user01 | PCH380 | GET WINDOW TITLE | REGULAR | [MY DOCUMENT]WINDOW WAS DETECTED. APPLICATION NAME:[Explorer] |
| PCH380 | 17:38:54 | user01 | PCH380 | GET WINDOW TITLE | REGULAR | [START MENU]WINDOW WAS DETECTED. APPLICATION NAME:[Explorer] 707 |
| PCH380 | 17:39:05 | user01 | PCH380 | GET WINDOW TITLE | REGULAR | [MY COMPUTER]WINDOW WAS DETECTED. APPLICATION NAME:[Explorer] |
| PCH380 | 17:39:09 | user01 | PCH380 | GET WINDOW TITLE | REGULAR | [FUNCTION SELECTION]WINDOW WAS DETECTED. APPLICATION NAME:[SLBDTKJoin] |
| PCH380 | 17:39:10 | user01 | PCH380 | GET WINDOW TITLE | REGULAR | [CONFIRMATION]WINDOW WAS DETECTED. APPLICATION NAME:[SLBDTKJoin] ← 702 |
| PCH380 | 17:39:11 | user01 | PCH380 | TERMINATE APPLICATION | REGULAR | [SLBDTKJoin]WAS TERMINATED. |
| PCH380 | 17:39:13 | daiko | PCH380 | GET WINDOW TITLE | REGULAR | [FINGERPRINT PASSWORD AUTHENTICATION]WINDOW WAS DETECTED. APPLICATION NAME:[SLBDTKJoin] |
| PCH380 | 17:39:13 | daiko | PCH380 | ACTIVATE APPLICATION | REGULAR | [SLBDTKJoin]WAS ACTIVATED. ← 703 |
| PCH380 | 17:39:19 | daiko | PCH380 | TERMINATE APPLICATION | REGULAR | [SLBDTKJoin]WAS TERMINATED. |
| PCH380 | 17:39:21 | user02 | PCH380 | GET WINDOW TITLE | REGULAR | [AUTHENTICATION]WINDOW WAS DETECTED. APPLICATION NAME:[SLBDTKJoin] |
| PCH380 | 17:39:21 | user02 | PCH380 | ACTIVATE APPLICATION | REGULAR | [SLBDTKJoin]WAS ACTIVATED. |
| PCH380 | 17:39:23 | user02 | PCH380 | ACTIVATE APPLICATION | REGULAR | [Explorer]WAS ACTIVATED. ← 708 |
| PCH380 | 17:39:23 | user02 | PCH380 | GET WINDOW TITLE | REGULAR | [MY COMPUTER]WINDOW WAS DETECTED. APPLICATION NAME:[Explorer] |
| PCH380 | 17:39:29 | user02 | PCH380 | GET WINDOW TITLE | REGULAR | [AUTHENTICATION]WINDOW WAS DETECTED. APPLICATION NAME:[SLBDTKJoin] |
| PCH380 | 17:39:30 | user02 | PCH380 | GET WINDOW TITLE | REGULAR | [MY DOCUMENT]WINDOW WAS DETECTED. APPLICATION NAME:[Explorer] ← 709 |
| PCH380 | 17:39:32 | user02 | PCH380 | GET WINDOW TITLE | REGULAR | [AUTHENTICATION]WINDOW WAS DETECTED. APPLICATION NAME:[SLBDTKJoin] |
| PCH380 | 17:39:32 | user02 | PCH380 | TERMINATE APPLICATION | REGULAR | [Explorer]WAS TERMINATED. |
| PCH380 | 17:39:33 | user02 | PCH380 | GET WINDOW TITLE | REGULAR | [FUNCTION SELECTION]WINDOW WAS DETECTED. APPLICATION NAME:[SLBDTKJoin] ← 706 |
| PCH380 | 17:39:36 | user02 | PCH380 | GET WINDOW TITLE | REGULAR | [CONFIRMATION]WINDOW WAS DETECTED. APPLICATION NAME:[SLBDTKJoin] |
| PCH380 | 17:39:37 | user02 | PCH380 | TERMINATE APPLICATION | REGULAR | [SLBDTKJoin]WAS TERMINATED. |
| PCH380 | 17:39:57 | daiko | PCH380 | GET WINDOW TITLE | REGULAR | [Program Manager]WINDOW WAS DETECTED. APPLICATION NAME:[Explorer] |
| PCH380 | 17:39:58 | daiko | PCH380 | ACTIVATE APPLICATION | REGULAR | [ctfmon]WAS ACTIVATED. |
| PCH380 | 17:40:11 | daiko | PCH380 | GET WINDOW TITLE | REGULAR | [START MENU]WINDOW WAS DETECTED. APPLICATION NAME:[Explorer] |
| PCH380 | 17:40:11 | daiko | PCH380 | ACTIVATE APPLICATION | REGULAR | [Explorer]WAS ACTIVATED. |
| PCH380 | 17:40:14 | daiko | PCH380 | GET WINDOW TITLE | REGULAR | [Program Manager]WINDOW WAS DETECTED. APPLICATION NAME:[Explorer] |
| PCH380 | 17:40:14 | daiko | PCH380 | TERMINATE APPLICATION | REGULAR | [Explorer]WAS TERMINATED. |
| PCH380 | 17:40:16 | daiko | PCH380 | OPERATE FILE | REGULAR | OPERATION:[CREATE], FILE NAME:[C:¥Documents and Settings¥Administrator¥DESKTOP¥NEW FOLDER], DRIVE TYPE:[FIXED], APPLICATION NAME:[Explorer.exe] |
| PCH380 | 17:40:28 | daiko | PCH380 | OPERATE FILE | REGULAR | OPERATION:[CHANGE NAME], FILE NAME SOURCE:[C:¥Documents and Settings¥Administrator¥DESKTOP¥NEW FOLDER], DRIVE TYPE SOURCE:[FIXED], FILE NAME DESTINATION:[C:¥Documents and Settings¥Administrator¥DESKTOP¥DTKLog.0701_2], DRIVE TYPE DESTINATION:[FIXED], APPLICATION NAME:[Explorer.exe] |
| ... | ... | ... | ... | ... | ... | ... |

FIG.7

SHARING MANAGEMENT PROGRAM, SHARING MANAGEMENT METHOD, TERMINAL APPARATUS AND SHARING MANAGEMENT SYSTEM

CROSS-REFERENCE TO RELATED APPLICATIONS

This application is a continuing application, filed under 35 U.S.C. section 111(a), of International Application PCT/JP2005/012832, filed Jul. 12, 2005.

TECHNICAL FIELD OF THE INVENTION

This invention relates a resource utilization management technique in a case where a terminal apparatus is shared by plural users.

BACKGROUND OF THE INVENTION

For example, in a counter business in a store, in which rapid measures for customers are sought, there is a case where the use of necessary business applications is enabled in one terminal apparatus, and plural users share such a terminal apparatus. However, from the viewpoint of the security, such a utilization mode is not preferable, and based on the authority of the user who firstly booted up and logged into the terminal apparatus, various operations are carried out. Namely, even when a user other than the user who firstly booted up and logged into the terminal apparatus carries out an operation, which cannot be carried out based on his or her authority, such an operation cannot be prevented, and furthermore, only an operation log representing that a proper operation was carried out is recorded. Therefore, a method is considered that settings of the user authorities or the like are carried out in an operating system for each user, the login and log-off to the operating system are carried out every time when the user uses the terminal apparatus, and a log representing what user carries out what operation is saved.

However, there is a problem that the time unacceptable from the viewpoint of the customer service in the counter business in the store in which the rapid measures for the customers are sought is required for the login to the operating system. Therefore, the login and log-off to the operating system are not actually carried out even if they are required. In addition, although a solution exists that settings of the user authorities are carried out in the business application and the operations of the login and log-off are made to be mandatory, the cost for the change of the business application and the like is required.

Incidentally, for example, JP-A-H09-259274 discloses a fingerprint recognition apparatus having a fingerprint input unit that reads the fingerprint, a judgment unit that compares the input data obtained from the fingerprint input unit with the fingerprint data stored in a database, and is connected with them, and when the fingerprint judgment result is normal, the screen of the display device is turned ON, and the locked screen is returned to a usable state, and when the fingerprint judgment result is abnormal, the screen of the display device is turned OFF, and the screen is kept locking. However, this is insufficient for the leakage prevention of the secret information, which is a large problem in recent years.

SUMMARY OF THE INVENTION

Therefore, an object of this invention is to provide a technique enabling rapid user switching while securing the security in the terminal apparatus shared by plural users.

A sharing management method according to this invention is a sharing management method to share one terminal by a plurality of users, and includes: after completion of login to an operating system of the terminal or after booting up the operating system, starting to record log data for predetermined events (activation of a program, change of window display content, user operation or the like); and after the completion of the login to the operating system or after activating the operating system, prohibiting an operation other than predetermined operations including user authentication in a sharing management program, which is other than authentication in the operating system. Then, the log data after the aforementioned user authentication succeeded includes a user identifier in the sharing management program, wherein the user identifier relates to a user whose user authentication succeeded.

By carrying out such a processing, because the login and log-off for the operating system are not required, it is possible to shorten the time necessary for the user switching. Furthermore, because the login by the user authentication in the sharing management program and the log-off from the sharing management program are carried out, the user ID of the sharing management program is identified by the log data. Therefore, what user carries out what operation can be identified later from the log data. The security is also secured with the prohibiting the operation other than the predetermined operations including the aforementioned user authentication.

In addition, this invention may further include prohibiting an operation other than operations allowed to the user relating to the user authentication after the user authentication succeeded. Thus, it is possible to manage the operations of the user by reflecting the policy for each user, and the security is improved.

In addition, this invention may further include terminating an application program defined in a setting file in advance when the log-off from the sharing management program, which is different from the log-off from the operating system, is carried out. When there is no need to carry out a setting of the user authority for the business application, it is sufficient to identify what user uses what business application and carries out what operation after the user authentication by using the log data. However, for example, in a case where the user authentication is carried out further in the business application, when the business application is left activated, the access restriction according to the user authority for the business application becomes nominal. Thus, when the business application is terminated in addition to the log-off from the sharing management application, such a program does not occur.

Furthermore, the log-off from the sharing management program may be executed when the log-off is explicitly instructed, when a no-operation time exceeds a timeout period defined in the setting file in advance, or when termination of an application program defined in the setting file in advance is instructed. When the business of the user is tightly coupled to the application program, the log-off from the sharing management program may be automatically carried out in response to the termination of the application program.

Furthermore, an environment in the operating system may be shared with a plurality of users except a setting portion of the policy data necessary for the prohibiting an operation other than operations allowed to the user relating to the user authentication after the user authentication succeeded. Thus, the user authentication for the sharing management program enables to use the business application more rapidly than the login to the operating system.

In addition, this invention may further include activating an application program defined in the setting file in advance after the user authentication succeeded. This is because the user's convenience is considered.

A terminal apparatus according to this invention is a terminal apparatus shared by a plurality of users, and has an operating system, and a sharing management program. Then, the aforementioned sharing management program causes to record log data for predetermined events after completion of login to the operating system of the terminal apparatus or after booting up operating system, and prohibits an operation other than predetermined operations including user authentication in the sharing management program, which is different from authentication in the operating system after the completion of the login to the operating system or after booting up the operating system. In addition, the log data after the user authentication succeeded includes a user identifier in the sharing management program, which relates to the user whose user authentication succeeded.

In addition, a sharing management system including such a terminal apparatus and a server including a storage device to store the log data. Furthermore, the sharing management system may include an authentication server.

It is possible to create a program causing a computer to execute the aforementioned method, and this program is stored, for example, in a storage medium or a storage device such as a flexible disk, CD-ROM, magneto-optical disk, a semiconductor memory, a hard disk or the like. In addition, the program may be distributed as digital signals through a network or the like. Incidentally, the intermediate processing result is temporarily stored into a storage device such as a memory.

BRIEF DESCRIPTION OF THE DRAWINGS

FIG. 7 is a diagram showing an example of data stored in the log DB.

DETAILED DESCRIPTION OF THE PREFERRED EMBODIMENTS

Figure 1:
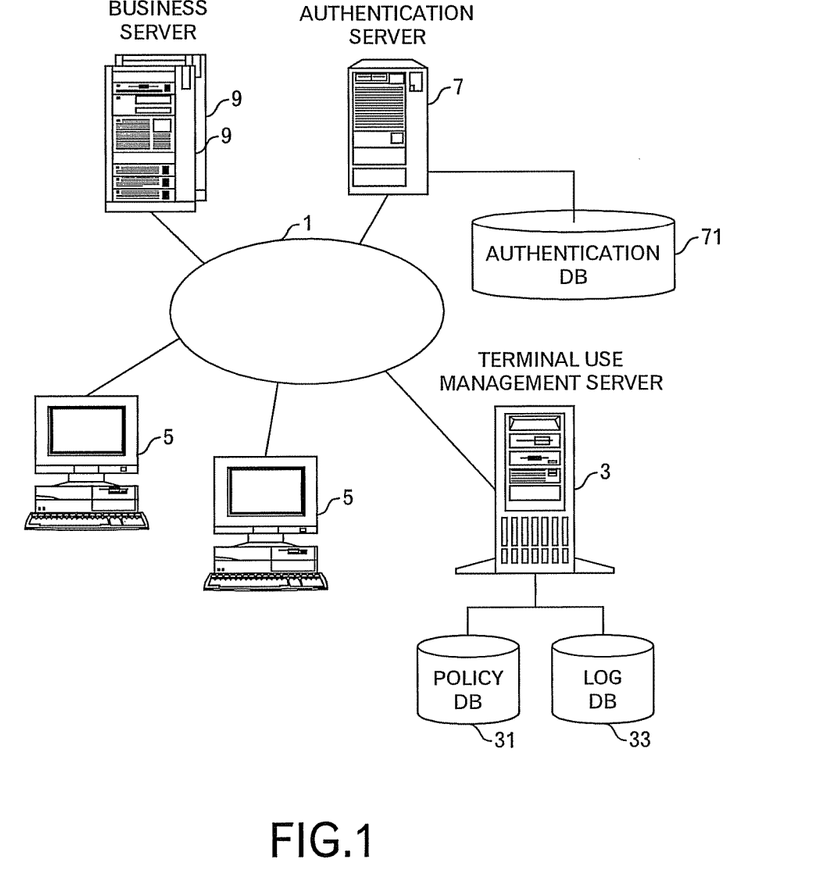
FIG. 1 is a system outline diagram in an embodiment of this invention.

FIG. 1 shows a system outline diagram of a sharing management system in one embodiment of this invention. In the sharing management system according to this embodiment, a terminal use management server 3, one or plural terminals 5 shared by plural users, an authentication server 7, and one or plural business server 9 are connected to a network 1 such as the Intranet. The terminal use management server 3 manages a policy DB 31 storing policy data for each user of the terminal 5, and a log DB 33 storing log data concerning events, which occurred in the terminal 5. The terminal use management server 3 reads out the policy data for the user who uses the terminal 5 from the policy DB 31 in response to a request from the terminal 5, and transmits the policy data to the terminal 5 of the requesting source through the network 1. In addition, the terminal use management server 3 receives the log data from the terminal 5 through the network 1, and stores the log data into the log DB 33. The authentication server 7 receives authentication data for the sharing management program described later, which is inputted into the terminal 5, carries out an authentication processing by using the received authentication data and the authentication DB 71, and transmits the authentication result to the terminal 5 of the transmission source through the network 1. The business server 9 is a server that provides various business services, and it is possible to use the business server 9 in this embodiment without any change.

Figure 2:
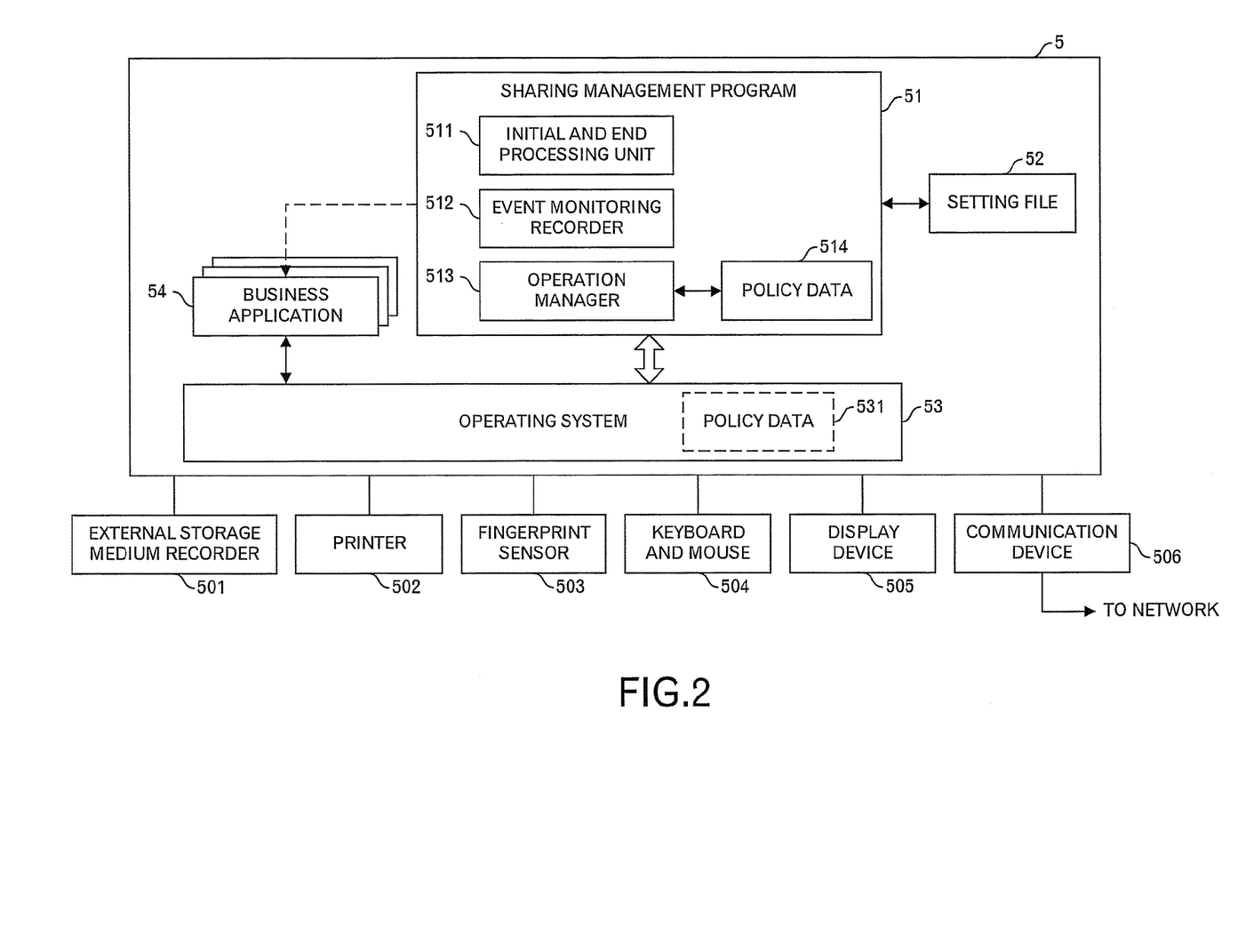
FIG. 2 is a functional block diagram of a terminal in the embodiment of this invention.

FIG. 2 shows a functional block diagram of the terminal 5. In the functional block diagram of FIG. 2, only a portion relating to this embodiment is shown, and in order to make it easy to understand, the hardware, which is actually connected to the terminal 5 and is also built into the terminal 5, is shown outside of the terminal 5. The terminal 5 is connected to or includes inside of it, an external storage medium recorder 501, which is a drive device of the external recording medium such as the flexible disk, a Compact Dick (CD), a Digital Versatile Disk (DVD) or a memory card conforming with any standard or storage device, a printer 502, a fingerprint sensor 503, keyboard and mouse 504, a display device 505, and a communication device 506 to connect with the network 1. The external storage medium recorder 501 may be a Universal Serial Bus (USB) memory or portable hard disk drive conforming with any connection standard.

In addition, the user terminal 5 includes an operating system 53 in which the authority can be set for each user and the user can login through the authentication, one or plural business applications 54 that are executed on the operating system 53 and carries out a business processing while cooperating with, for example, the business server 9, a sharing management program 51 that carries out the main processing in this embodiment, and a setting file 52 including setting data for the sharing management program 51. Although it is not shown in the diagram, various programs are included in the terminal 5 and executed. The sharing management program 51 includes an initial and end processing unit 511, an event monitoring recorder 512, an operation manager 513 and policy data 514 obtained from the terminal use management server 3. Incidentally, a portion of the policy data is set from the sharing management program 51 into the registry of the operating system 53 as policy data 531.

Next, an operation of the sharing management system shown in FIGS. 1 and 2 will be explained by using FIGS. 3 to 7. Firstly, the operating system (which will be abbreviated as "OS" in the following) 53 is booted up in the terminal 5 according to the operation of the user, and the login is carried out as a predetermined user in the OS 53 (step S1). This processing is similar to conventional one. Furthermore, a setting to automatically activate the sharing management program 51 when the OS 53 is booted up is made in the OS 53, and the sharing management program 51 is activated next to the step S1 (step S3). When the sharing management program 51 is activated, the event monitoring recorder 512 starts monitoring and recording of events of predetermined kinds (step S5). The event monitoring recorder 512 transmits data of the detected event as log data to the terminal use management server 3 through the network 1, and the terminal use management server 3 receives the log data, and stores the log data into the log DB 33. The data registered in the log DB 33 will be explained later.

Figure 3:
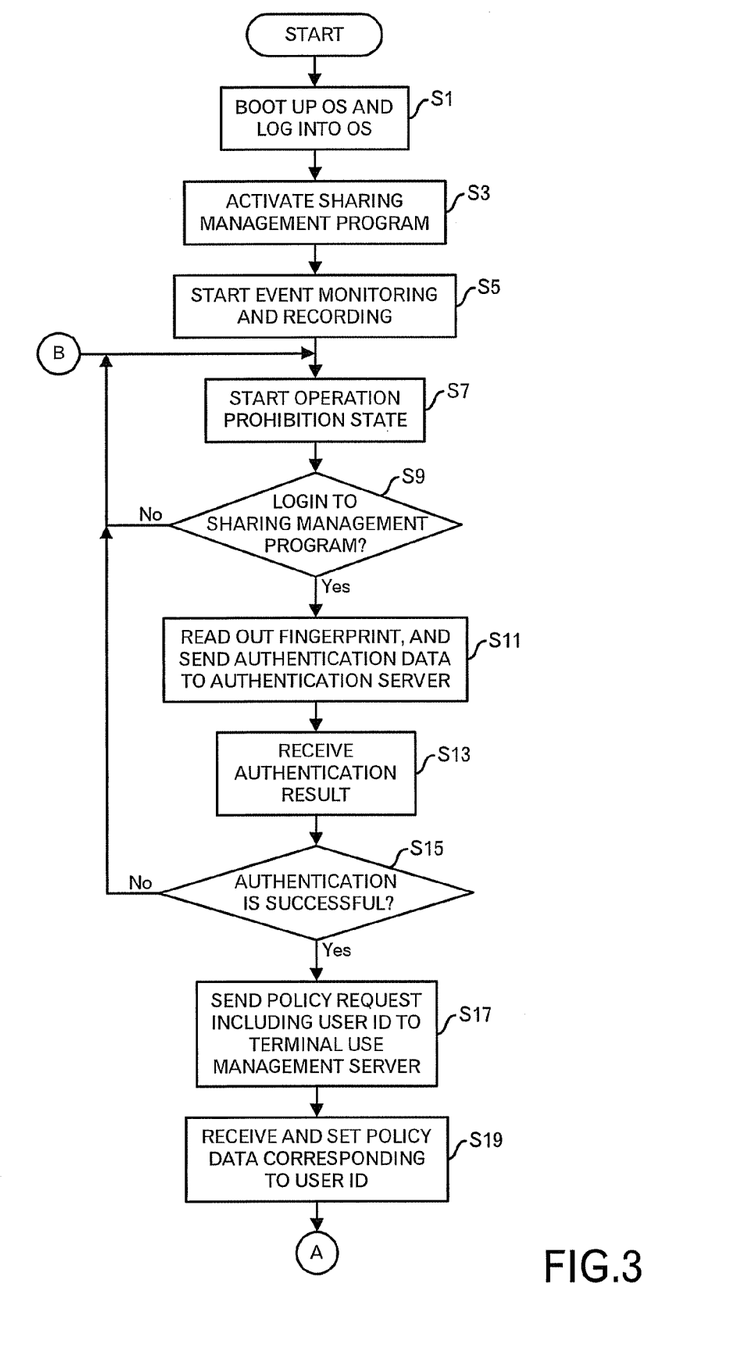
FIG. 3 is a diagram showing a processing flow of the embodiment of this invention.

Moreover, the operation manager 513 prohibits all operations except the operation for the login to the sharing management program 51 and the shutdown or log-off operation of the OS 53 (step S7). That is, an operation prohibition state is started. Thus, the user of the terminal 5 cannot carry out any operations such as activation and use of the business application 54 until he or she carries out the login to the sharing management program 51.

After that, the initial and end processing unit 511 accepts an operation input by the user, and judges whether or not the operation input means the login to the sharing management program 51 (step S9). When the operation input does not mean the login to the sharing management program 51, the processing returns to the step S7. Incidentally, the shutdown or log-off operation of the OS 53 or the like is accepted, but in order to simplify the explanation, here, a case is indicated that only the login to the sharing management program 51 is accepted.

When the operation input means the login to the sharing management program 51, the initial and end processing unit 511 accepts, for example, an input of the user ID, reads the fingerprint of the user by the fingerprint sensor 503, and transmits the user ID and fingerprint data as the authentication data to the authentication server 7 through the network 1 (step S11).

The authentication server 7 reads out the authentication data from the authentication DB 71 by using the user ID, and carries out a well-known authentication processing by using the received authentication data and the read authentication data. The authentication server 7 transmits the authentication result to the terminal 5, which is the transmission source of the authentication data.

The initial and end processing unit 511 of the sharing management program 51 in the terminal 5 receives the authentication result from the authentication server 7 (step S13), and judges whether or not the authentication is successful (step S15). When the authentication is failed, the processing returns to the step S7. However, because the event monitoring and recording have already been started, they continue as they do. Incidentally, when the authentication is failed, a counter is incremented by 1 to count the number of sequential failure times, and when the authentication is failed sequentially a predetermined number of times, the user ID may be revoked.

When the authentication is successful, the initial and end processing unit 511 transmits a policy request including the user ID of the user who carried out the login to the terminal use management server 3 (step S17). The terminal use management server 3 receives the policy request including the user ID from the terminal 5, reads out the policy data to be applied by searching the policy DB 31 by the received user ID, and replies the policy data to the terminal 5 of the requesting source. The policy data comprises a list of the business applications, which are allowed to be executed by the user who carried out the login, or a list of the business applications, which are prohibited from executing by the user, a list of the hardware (e.g. the external storage medium recorder 501, the printer 502 and the like), which is prohibited from using by the user who carried out the login, and the like.

Incidentally, although it is not shown in the diagrams, because the recording of the log data is started at the step S5, the user ID of the user who carried out the login to the sharing management program 51 is also included into the log data, and registered into the log DB 33. Therefore, even in a state where the user of the OS 53 is not changed, it is recorded that the user in the sharing management program 51 is changed.

The initial and end processing unit 511 of the sharing management program 51 in the terminal 5 receives the policy data corresponding to the user ID, and sets the policy data into the sharing management program 51 and the OS 53 (step S19). For example, the policy data 514 for the business applications, which are allowed to be executed by the user who carried out the login or the business application, which are prohibited from executing is set to the sharing management program 51, and the policy data 531 for the hardware is set to the OS 53. Such sharing is a mere example, and all policy data may be set to the sharing management program 51. The processing shifts to step S21 of FIG. 4 through a terminal A.

Figure 4:
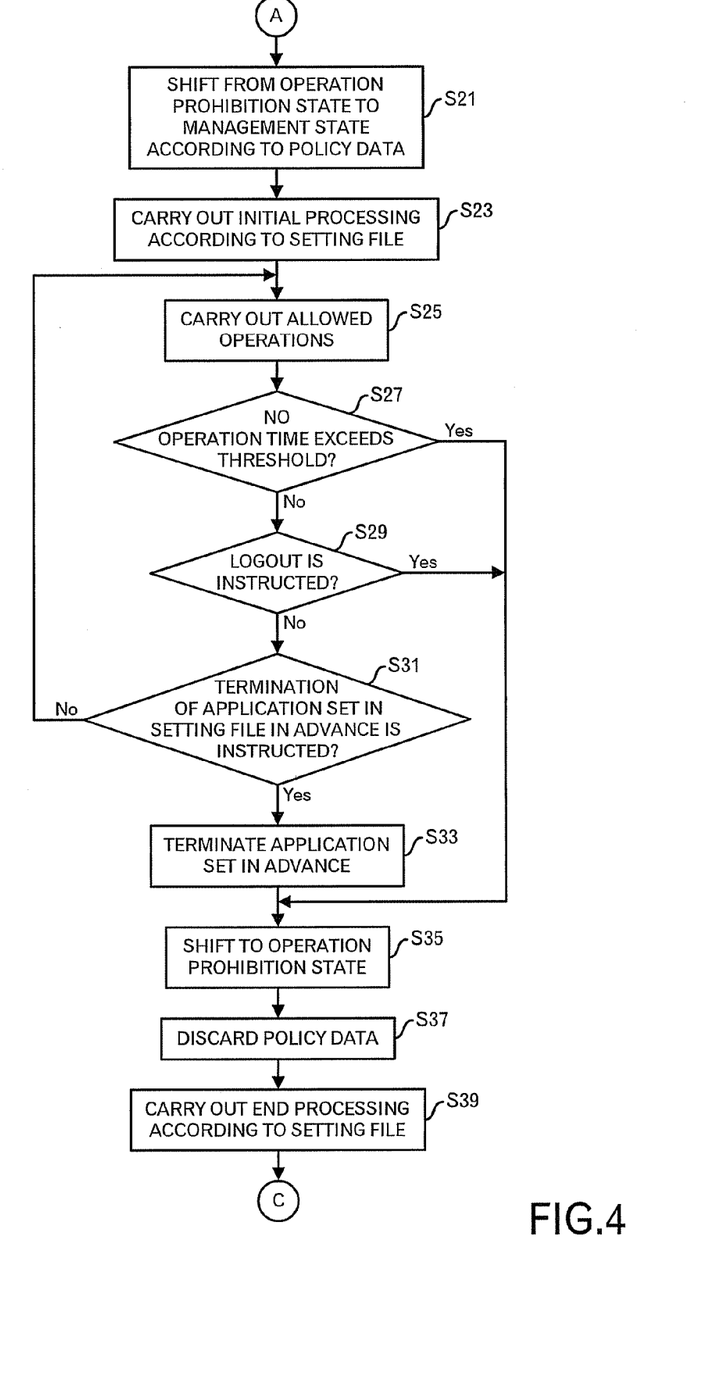
FIG. 4 is a diagram showing a processing flow of the embodiment of this invention.

Next, the operation manager 513 shifts to a management state according to the policy data from the operation prohibition state (step S21). For example, the operation manager 513 hooks a message in the OS 53, which is generated by carrying out an operation to activate the business application 54, to judge whether or not an activation of the allowed or prohibited business application, which is defined in the policy data, is instructed, and when it is judged that the activation of the business application, which is not allowed to be executed or is prohibited from executing, is instructed, the activation of the business application is suppressed. The activated application programs may be periodically identified, and when the business application 54, which is prohibited from executing, is detected among them, the business application 54 may be terminated. The OS 53 also handles the hardware, which is prohibited from using, as being disabled, according to the set policy data. For example, when the push of the screen copy (i.e. Print Screen) key is prohibited, the push of the key is ignored in a case where the push of the key is detected. In addition, when the copy of the file or the like to the external storage medium is prohibited, for example, the copy operation to the external storage medium, which is prohibited, is ignored in a case where the copy operation is detected. In certain circumstances, the OS 53 makes the pertinent external storage medium recorder 501 unable to see from the user, or the OS 53 does not recognize the recorder 501. In addition, even when the copy is allowed, a predetermined encryption may be carried out for the file. Furthermore, the output to the printer 502 may be prohibited.

Figure 5:
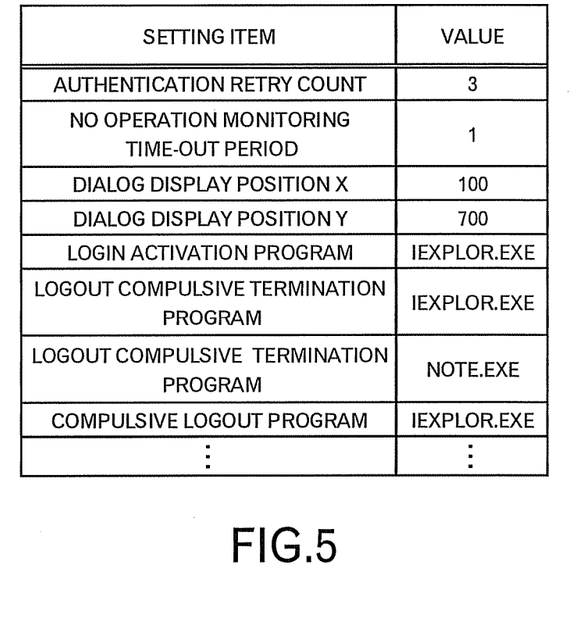
FIG. 5 is a diagram showing an example of a setting file in the embodiment of this invention.
Figure 6:
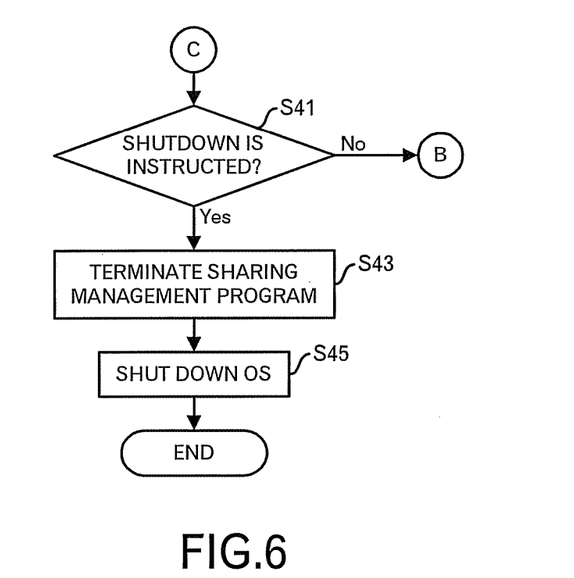
FIG. 6 is a diagram showing a processing flow of the embodiment of this invention.

Furthermore, the initial and end processing unit 511 reads the setting file 52 held in the storage device of the terminal 5, and carries out an initial processing according to the settings in the setting files 52 (step S23). One example of the setting file 52 is shown in FIG. 5. In the example of FIG. 5, the setting items include an authentication retry count (the permissible number of sequential times of the authentication failure), a no-operation monitoring time-out period (time until the log-off is automatically carried out), a dialog display position X (X coordinate in the previous display position of the dialog window of the sharing management program 51), a dialog display position Y (Y coordinate in the previous display position of the dialog window of the sharing management program 51), a login activation program (the business application 54, which is automatically activated at the step S23), a logout compulsive termination program (the business application 54, which is compulsively terminated at the logout), a compulsive logout program (the business application 54 whose termination causes to automatically carry out the logout of the sharing management program 51), or the like, and values for each item are set. At the step S23, "IEXPLOR.EXE", which is designated as the login activation program, is automatically activated. Plural login activation programs may be designated, and all designated business applications are activated in such a case.

By carrying out the processing until here, the user who carried out the login to the sharing management program 51 can freely carry out any allowed operations by using the keyboard and mouse 504, and the log data for the operation, which was carried out, is recorded. That is, the operation manager 513 causes to execute the allowed operation according to the user's instruction as it is (step S25). Incidentally, when the prohibited operation is carried out, the log data for the operation is recorded. Moreover, as for the window of the activated business application 54, data of the title is acquired to record the log data indicating what window is opened. Thus, the user who carried out an operation, which leads to the information leakage, can be identified.

In addition, the initial and end processing unit 511 judges whether or not the no-operation time exceeds a threshold (specifically, the no operation monitoring time-out period) set in the setting file 52 (step S27). That is, the user leaves the seat without carrying out the logout. When it is judged that the no-operation time exceeds the threshold, the processing shifts to the step S35. On the other hand, when it is judged that the no-operation time does not exceeds the threshold, the initial and end processing unit 511 judges whether or not the logout is explicitly instructed by the user (step S29). When it is judged that the logout is explicitly instructed by the user, the processing shifts to the step S35. When it is judged that the logout is not instructed, the initial and end processing unit 511 judges whether or not the termination of the business application 54 (i.e. the business application 43 set as the compulsive logout program), which is set in the setting file 52 in advance, is instructed (step S31). When it is judged that the termination of the business application 54, which is set in the setting file 52 in advance, is not instructed, the processing shifts to the step S25. On the other hand, when it is judged that the termination of the business application 54, which is set in the setting file 52 in advance, is instructed, the initial and end processing unit 511 terminates the business application 54, which is set in advance, as the normal processing (step S33). Thus, when the main object of sharing the terminal 5 is to use the business application 54, which is set in the setting file 52 in advance, (or in a case where the execution of other business applications 54 is prohibited), and the system is in a state that the log-off or termination of the business application 54 should be carried out when the users are switched, this processing is effective.

When the affirmative judgment is carried out at the steps S27 and S29 or after the step S33, the operation manager 513 of the sharing management program 51 returns from the management state according to the policy data 514 to the operation prohibition state that any operation other than the predetermined operations such as the login to the sharing management program 51 are prohibited (step S35). As a result, the user cannot have the business application 54 executed. In addition, the operation manager discards the policy data 514 and 531 (step S37). As a result, the setting for the user who has been logged off is released, and the state returns to the default state.

Furthermore, the initial and end processing unit 511 carries out an end processing according to the settings of the setting file 52 (step S39). There is a case where the logout compulsive termination program is defined in the setting file 52. The access authority or the like may be set in the business application 54, and the function and information the user can use may be different. In such a case, if the business application 54 is left activated when the user carries out the logout of the sharing management program 51, there is a case where the user who carries out the login later to the sharing management program 51 accesses the information to which the access is prohibited, based on the authority of the user who previously carried out the logout. Thus, when the business application 43 is automatically terminated in response to the logout, the aforementioned problem does not occur. The processing shifts to a processing of FIG. 6 through a terminal C.

When the operation manager 513 is in the operation prohibition state, only the predetermined operations such as the login to the sharing management program 51, the shutdown of the OS 53 and the log-off of the OS 53 are allowed until another user carries out the login. For example, when the user inputs the shutdown instruction (FIG. 6: step S41), the sharing management program 51 is terminated (step S43), and the processing of the event monitoring recorder 512 is also terminated. After that, the OS 53 is shut down (step S45). Incidentally, although it is not shown, when the log-off of the OS 53 is instructed, the processing returns to the boot-up of the OS 53 on the way of the step S1. In other cases, the processing returns to the step S7 through the terminal B. Because the shutdown or the like can be carried out even when the sharing management program 51 is in the operation prohibition state, there is no need to take the trouble to carry out the login before the shutdown or the like. Accordingly, the job of the user is reduced.

Although the description is made again, the event monitoring recorder 512 transmits the log data to the terminal use management server 3 in response to the detection of the predetermined events such as the user's operation, from the step S5 to the step S43, and the log data is stored into the log DB 33. One example of the log data stored in the log DB 33 is shown in FIG. 7. In an example of FIG. 7, a terminal name, time, user ID in the sharing management program 51, domain name, type of the event, distinction of whether or not it is prohibited operation, content of the operation are registered. In the example of FIG. 7, it is possible to grasp, from data in the column of the user ID, that the user of the OS 53, who is "daiko", exists in default, that the user who is "user01" uses between the thick lines 701 and 702, and that the user who is "user02" is uses between the thick lines 703 and 704. In addition, when referring to the column of the type, in this embodiment, it can be understood that such settings that events such as "get window title", "activate application", "terminate application", "operate file" by the application activation or change of the display content are detected are carried out. Furthermore, from the column of the content, it is possible to identify what application program is activated, what window of what application program is displayed, and what file operation is carried out. In addition, from the column of the type and the column of the content, it is possible to identify the activation and termination of the application program and the screen transition. In the example of FIG. 7, at the record 705, an application program, which is "Explorer", was activated, and further terminated at the record 706, and the screen transition between them such as "My Documents", "Start Menu", and "My Computer" in the record group 707, "My Computer" in the record 708, and "My Documents" in the record 709 is identified. As for the file operation, not only the types such as create, delete and change name, but also the file name of the target and the used application programs are recorded. Accordingly, the operation content of the user can be identified in detail. That is, it is possible to identify what user carried out the action, which leads to the information leakage. Incidentally, the sharing management program 51 according to this embodiment is shown as "SLBDTKJoin" in FIG. 7.

In the example of FIG. 7, the log data of the network access to the network 1 is not included, but it is possible to record the log data of the network access. In addition, in the example of FIG. 7, although it is described that only the application program name, such as "Explorer" is recorded, the process ID may be recorded, additionally. For example, by additionally recording the process ID like [Explorer (PID=1540)] it is possible to identify each process by the process ID (PID) even when the same program is duplicately activated. Therefore, an effect can be obtained that it is possible to easily identify to what process the operation content, which was additionally recorded, relates.

When the aforementioned processing is carried out, there is no need to carry out the login and logout to the OS 53 even in the terminal, which is shared by plural users. Accordingly, the user switching can be rapidly carried out. Although it takes about three minutes for the login of the OS 53, it is possible to carry out the login in this embodiment by 5 seconds to about 10 seconds. This is because the environment of the OS 53 is shared except the portion set by the policy data 531 without resetting the environment of the OS 53 every user. In addition, there is no need to carry out any special change for the business application 54 when adopting this embodiment. Because, as described above, the log data is saved in detail, it is possible to identify the reason when any problem occurs later. Moreover, when it is made known to the users that the detailed log data is acquired, the prohibited acts can be suppressed.

Although one embodiment of this invention is described above, this invention is not limited this. For example, the log data for the change of the hardware configuration of the terminal 5 may be created and stored into the log DB 33. In addition, when the activation of the service process, which is not the application program, is also managed, it is possible to suppress the activation of the virus and worm. Moreover, at least either of the function of the authentication server 7 and the function of the terminal use management server 3 may be held in the terminal 5.

In addition, the functional blocks of the sharing management program 51 does not always correspond to the actual program modules.

What is claimed is:

1. A computer-readable, non-transitory storage medium storing a sharing management program for causing a computer to execute a process, the process comprising:
    after completion of login to an operating system of a terminal or after booting up the operating system, prohibiting an operation other than predetermined operations including user authentication in the sharing management program, wherein the user authentication is other than authentication in the operating system, and the predetermined operations further include shutdown of the operating system and log-off from the operating system;
    upon detecting an activation instruction of an application program by a certain user who logged into the sharing management program after the user authentication in the sharing management program, determining, based on information associating a user identifier of a user with a name of an application program whose utilization is permitted for the user, whether the application program of the detected activation instruction is permitted for the certain user;
    upon determining that the application program of the detected activation instruction is permitted for the certain user, activating the application program of the detected activation instruction;
    detecting log-off from the sharing management program, which is other than the log-off from the operating system; and
    after detecting the log-off from the sharing management program, terminating an application program, by referring to a setting file storing a name of the application program that is automatically terminated after the log-off from the sharing management program; and wherein the sharing management program is executed by a terminal shared with a plurality of users, and
the log-off from the sharing management program is executed in any one of a case where the log-off is explicitly instructed, a case where a no-operation time exceeds a timeout period defined in the setting file in advance, and a case where termination of an application program defined in the setting file in advance is instructed.

2. A terminal apparatus, comprising:
    a memory;
    a processor that uses the memory;
    an operating system that is executed by the processor; and
    a sharing management program that is executed by the processor, and
    wherein the sharing management program prohibits an operation other than predetermined operations including user authentication in the sharing management program, after completion of login to the operating system or after booting up the operating system, wherein the user authentication is other than authentication in the operating system, and the predetermined operations further include shutdown of the operating system and log-off from the operating system,
    upon detecting an activation instruction of an application program by a certain user who logged into the sharing management program after the user authentication in the sharing management program, the sharing management program determines, based on information associating a user identifier of a user with a name of an application program whose utilization is permitted for the user, whether the application program of the detected activation instruction is permitted for the certain user,
    upon determining that the application program of the detected activation instruction is permitted for the certain user, the sharing management program activates the application program of the detected activation instruction,
    the sharing management program detects log-off from the sharing management program, which is other than the log-off from the operating system,
    the sharing management program terminates an application program after the log-off from the sharing management program, by referring to a setting file storing a name of the application program that is automatically terminated after the log-off from the sharing management program,
    the terminal apparatus is shared with a plurality of users, and
    the log-off from the sharing management program is executed in any one of a case where the log-off is explicitly instructed, a case where a no-operation time exceeds a timeout period defined in the setting file in advance, and a case where termination of an application program defined in the setting file in advance is instructed.

3. A sharing management method, comprising:
    after completion of login to an operating system of a terminal or after booting up the operating system, prohibiting an operation other than predetermined operations including user authentication in a sharing management program, wherein the user authentication is other than authentication in the operating system, and the predetermined operations further include shutdown of the operating system and log-off from the operating system;
    upon detecting an activation instruction of an application program by a certain user who logged into the sharing management program after the user authentication in the sharing management program, determining, based on information associating a user identifier of a user with a name of an application program whose utilization is permitted for the user, whether the application program of the detected activation instruction is permitted for the certain user;

upon determining that the application program of the detected activation instruction is permitted for the certain user, activating the application program of the detected activation instruction;

detecting log-off from the sharing management program, which is other than the log-off from the operating system; and after detecting the log-off from the sharing management program, terminating an application program, by referring to a setting file storing a name of the application program that is automatically terminated after the log-off from the sharing management program; and wherein the sharing management method is executed by the terminal shared with a plurality of users, and the predetermined operations further includes shutdown of the operating system and log-off from the operating system.

* * * * *